US 8,751,872 B2

(12) United States Patent
Khanna et al.

(10) Patent No.: US 8,751,872 B2
(45) Date of Patent: Jun. 10, 2014

(54) SEPARATION OF ERROR INFORMATION FROM ERROR PROPAGATION INFORMATION

(75) Inventors: Kumar Gaurav Khanna, Woodinville, WA (US); Eric L. Eilebrecht, Woodinville, WA (US); Melitta L. G. Andersen, Redmond, WA (US); Diana Milirud, Newcastle, WA (US); Stephen H. Toub, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 351 days.

(21) Appl. No.: 13/117,387

(22) Filed: May 27, 2011

(65) Prior Publication Data
US 2012/0304026 A1 Nov. 29, 2012

(51) Int. Cl.
*G06F 11/30* (2006.01)
*G06F 11/34* (2006.01)

(52) U.S. Cl.
USPC .................. 714/38.1; 717/124; 717/127

(58) Field of Classification Search
USPC ........... 714/38.1, 38.13, 38.14; 717/124, 125, 717/126, 129, 127, 128
See application file for complete search history.

(56) References Cited

U.S. PATENT DOCUMENTS

| 6,041,425 | A * | 3/2000 | Kokunishi et al. ............ 714/37 |
| 7,088,845 | B2 | 8/2006 | Gu et al. |
| 7,475,387 | B2 * | 1/2009 | Chandane .................... 717/128 |
| 7,487,380 | B2 * | 2/2009 | Brumme et al. ................. 714/3 |
| 7,490,081 | B2 * | 2/2009 | Best et al. ............................ 1/1 |
| 7,840,946 | B2 * | 11/2010 | Gupta et al. ................... 717/124 |
| 8,201,026 | B1 * | 6/2012 | Bornstein et al. .............. 714/45 |
| 8,359,604 | B2 * | 1/2013 | Duffy et al. ................... 719/318 |
| 2009/0030870 | A1 | 1/2009 | Michailov et al. |
| 2009/0049428 | A1 * | 2/2009 | Cozmei ......................... 717/128 |
| 2010/0192023 | A1 | 7/2010 | Dawson |
| 2011/0078691 | A1 * | 3/2011 | Yildiz et al. ................... 718/103 |

OTHER PUBLICATIONS

Wikipedia's Call Stack version from May 13, 2011 http://en.wikipedia.org/w/index.php?title=Call_stack&oldid=428902156.*
"Advanced Exception Handling Concepts," Chapter 3, pp. 33-54, Jul. 16, 2004, http://ptgmedia.pearsoncmg.com/images/0131008528/samplechapter/0131008528_ch03.pdf, retrieved Mar. 17, 2011.
Alter et al., "Error Propagation in Full 3D-from-2D Object Recognition," IEEE Xplore Digital Library, pp. 892-898, published Jun. 21-23, 1994, http://ieeexplore.ieee.org/Xplore/login.jsp?url=http%3A%2F%2Fieeexplore.ieee.org%2Fstamp%2Fstamp.jsp%3Ftp%3D%26arnumber%3D323920&authDecision=-203.
"Exception Dispatching", http://msdn.microsoft.com/en-us/library/ms679327%28v=vs.85%29.aspx, built Mar. 10, 2011; retrieved Mar. 17, 2011, 2 pages.

(Continued)

*Primary Examiner* — Joseph Schell
(74) *Attorney, Agent, or Firm* — Kevin Sullivan; Kate Drakos; Micky Minhas

(57) ABSTRACT

A system and method for handling exceptions in a multi-threaded computing environment. Information, such as that relating to an error state or pertaining to the propagation history of an exception, is stored in a separate object from the exception object itself. The separate propagation information object is accessible to the plurality of threads that are used to execute a user task. The separate object allows rich diagnostic information pertaining to the exception and its propagation through multiple threads to be presented to the developer of the software.

20 Claims, 8 Drawing Sheets

(56) References Cited

OTHER PUBLICATIONS

"Exceptions and Exception Handling in C#," Chapter 36 of Exception Handling, http://www.cs.aau.dk/~normark/oop-08/html/notes/exceptions-themes-cs-error-handling-sect.html, retrieved Mar. 17, 2011, 22 pages.

Kougiouris, P., "Propagate Error Info: Use ATL and C++ to Implement Error-Handling COM Objects," MSDN Magazine, Oct. 2000, retrieved Mar. 17, 2011, http://msdn.microsoft.com/en-us/magazine/cc301496.aspx, 6 pages.

Maurer, J. and Meredith, A., "Exception Propagation across Threads," Oct. 13, 2006, http://www.open-std.org/jtc1/sc22/wg21/docs/papers/2006/n2107.html, retrieved Mar. 17, 2011, 5 pages.

\* cited by examiner

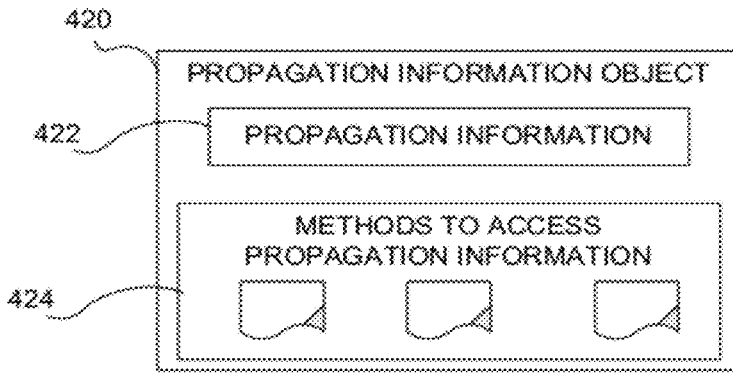

FIG. 4B

```
FUNCTION 432
void Function_432(int data) //Some function comprising code to execute {       //Code for Function_432
        .....
        runinNewThread Function_416(int data);
        .....

//Exception Handling Code catch (exception ExceptionA)
        {
            if (ExceptionA is received from a different thread)
            {      //Process thread by adding data to propagation object
                   Receive Propagation Information Object;
                   Keep information in the Propagation Information  Object
        intact;
                   Add more propagation information to Propagation Object;
            }
            else if (ExceptionA is thrown by same thread)
            {      //Generate new propagation object
                   Create new propagation information object;
                   Add information to propagation object;
            }
        }
} //End Function_432
```

FIG. 4C

SEPARATION OF ERROR INFORMATION FROM ERROR PROPAGATION INFORMATION

BACKGROUND

Though complex software is frequently written to handle many operating conditions, it is difficult to develop complex software that completely accounts for all possible conditions. Accordingly, software may encounter operating states that it is not expressly programmed to address. When condition that the software has not been programmed to address are encountered at run time, the software may "crash" the computer on which it is executing or other errors may occur. To deal with errors that occur at run-time while one or more processors executes computer software, exception handlers were developed. Exception handlers allow software a chance to correct problems and/or halt the execution of the software program in a manner that minimizes lost data or other disruptions. It is also possible to capture diagnostic information regarding the error and send this data to the developer of the software, upon approval by the user executing the software, so that the software may be improved or bugs can be fixed.

Accordingly, an operating system or other platform on which software may execute may have an exception handling system. When an error condition is encountered during the execution of some block of code, the exception handling system may halt execution of that block of code and then attempt to identify an error handler appropriate to use for that block of code.

Software is generally written such that a first main function calls one or more other functions. These functions themselves may call one or more additional functions. This is repeated chain of function calls representing a hierarchy of functions executing on one or more processors is referred to as a "call stack". Traditionally, this call stack was executed by a single unit of execution, known as a "thread." If an exception was thrown by a function buried deep in a call stack, and that function was not associated with an exception handler that could handle the exception, then the exception was passed from function to function, up the call stack, until the exception could be handled. Propagation information regarding the path the exception took through the call stack was bundled with other information about the exception. This propagation information represented an exception history that was useful to the developer of the software when trying to correct bugs in the software.

Modern computer systems often execute software on multiple, parallel threads that may be running on multiple processors. Therefore a single user task may be spread across many threads on many processors. Using traditional exception handling in this environment typically results in missing or incorrect exception propagation information.

SUMMARY

Described herein are techniques for handling exceptions in software that allow rich information about errors to be saved and presented to a developer of the software, especially in a computing environment where the software is executed on multiple threads. Such techniques may be used to capture and propagate error information outside of a chain of functions calls within a call stack for a single thread.

These techniques may include a mechanism to propagate error information. In some embodiments, the error information may be propagated as an error information object. As the exception propagates, any error handler to which that exception propagates, whether or not associated with a function in the same call stack as the function in which the exception in initially arose, may add error information to it. In this way, the error information object can collect error information, including exception propagation history, from functions in different threads or otherwise not in the same call stack. Such an error information object may be used to send an error report to a software developer, render a user interface or for other purposes.

In some embodiments, an error may be encountered while operating a first thread, the first thread executing a plurality of functions. An exception may be thrown while executing a first function of the first thread and may propagate from the first function to a second function within the first thread. Separate from the exception itself, the computer system may create a propagation information object and add information related to the propagation of the exception to the propagation object. If the exception propagates to a third function executed by a second thread, the exception may be re-thrown by the third function itself. The re-thrown exception may then propagate from the third function to a fourth function of the second thread. This new propagation information may be concatenated to the propagation information object that already holds the information pertaining to the propagation of the exception through the functions of the first thread.

In some embodiments, throwing the exception may comprise creating an exception object. The exception may be stored such that it is accessible to at least the first and second thread.

In some embodiments, the first and second threads may be executed on different processors. The exception may be passed from the first thread to the second thread as part of a message.

In some embodiments, the exception may be re-thrown while executing a fifth function of a third thread. A second propagation information object may be created that comprises propagation information from the first thread but not propagation information from the second thread. The exception may then propagate from the fifth function to the sixth function of the third thread. The new propagation information is then concatenated to the second propagation information object.

In some embodiments, a display device may display information related to the propagation history of an exception. This may be used by a software developer to analyze diagnostic information regarding the details of the error that has occurred while executing the software.

In some embodiments, computer-executable instructions for performing a method of handling exceptions may be stored on at least one computer-readable storage medium. In some embodiments, those instruction may encode an error handler for a function that receives an exception. In scenarios in which the exception propagates to the function from outside its call stack, an exception handler for that function may propagate the exception by re-throwing the exception. In connection with re-throwing the exception, the error handler may add error information to error information previously collected, and propagate that error information in connection with the re-thrown exception. Though, in some embodiments, the error handler may overwrite the error information. In yet further embodiments, the exception handler may conditionally overwrite or propagate previously generated error information in connection with re-throwing an exception based on dynamically determined conditions.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 4B is a simplified illustration of a propagation information object;

FIG. 4C is simplified pseudocode illustrating exception handling in a software function;

DETAILED DESCRIPTION

The inventors have appreciated that improved exception handling may be achieved by representing exception propagation information in a separate object, distinct from the object representing the exception itself. Such a representation may be particularly useful in a multi-threaded environment.

By using a propagation information object separate from the exception object, exception handling may represent discontiguous paths or multiple paths for a single error. This technique allows rich information about errors to be presented to the software developer, allowing more efficient troubleshooting of software bugs.

Techniques as described herein may be used in connection with any suitable exception handling system, including techniques as are known in the art. In such a system, when an error occurs, an exception object may be created and either handled by an exception handler associated with the function where the error occurred or passed up the call stack to a second function that called the function where the error occurred. This is an example of "throwing" an exception. A function within the call stack may be capable of handling the thrown exception, in which case the exception is handled.

The specific mechanism by which an exception is handled is not critical to the invention. Though, in some embodiments, handling an exception may involve collecting error information that can be reported to an error reporting system. Accordingly, exception handling may involve asking users of the software whether they would like to send error information to the software developer, allowing the developer to investigate the cause of the error and fix bugs and increase software reliability for future versions of the software. If so, processing an exception may entail collecting error information of the type that may be reported for software improvement or for other purposes.

Figure 1:
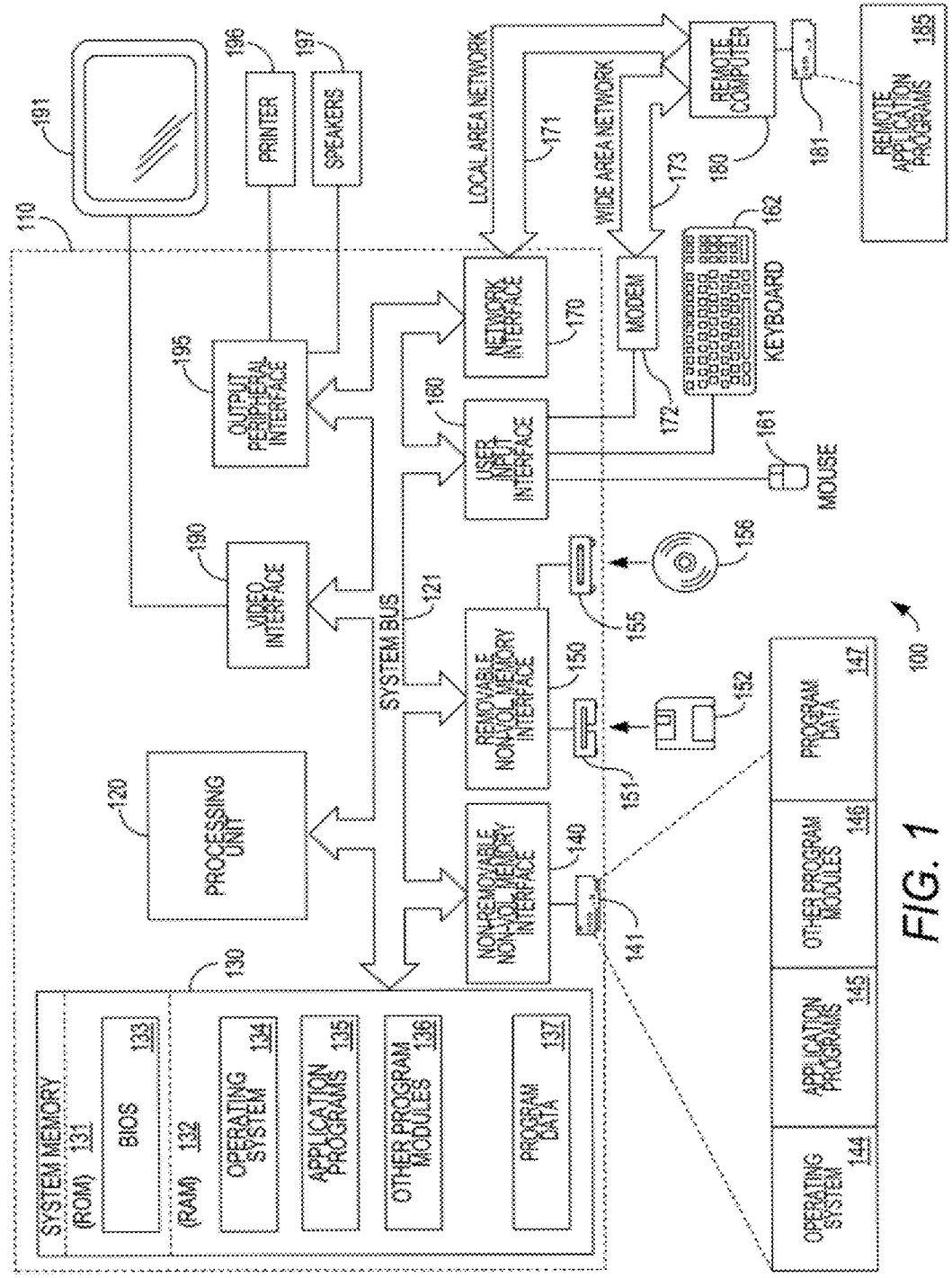
FIG. 1 is a block diagram of an exemplary computing environment in which embodiments of the present invention may operate.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers; server computers; mobile, hand-held, tablet or laptop devices; multiprocessor systems; microprocessor-based systems; set top boxes; programmable consumer electronics; network PCs; minicomputers; mainframe computers; distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Computer 110 is an example of a computer device that may implement exception handling techniques. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. In the embodiment illustrated, operating system 144 may provide an exception handling system. Though, it should be appreciated that the specific component containing the exception handling system is not critical to the invention, and the exception handling system may be incorporated into any suitable component.

A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The aforementioned processing unit 120 may be a single processor or comprise a plurality of processors. The processing unit executes units of execution scheduled by the operating system 134 known in the art as "threads." A single user task may be implemented by a plurality of threads. If only a single processor is available, then the plurality of threads are executed asynchronously such that each thread maintains access to the processor for a small slice of time before having to relinquish access to the processor to a different thread. In embodiments with multiple processors, the threads may be operating concurrently, such that multiple threads execute in parallel, simultaneously.

Figure 2:
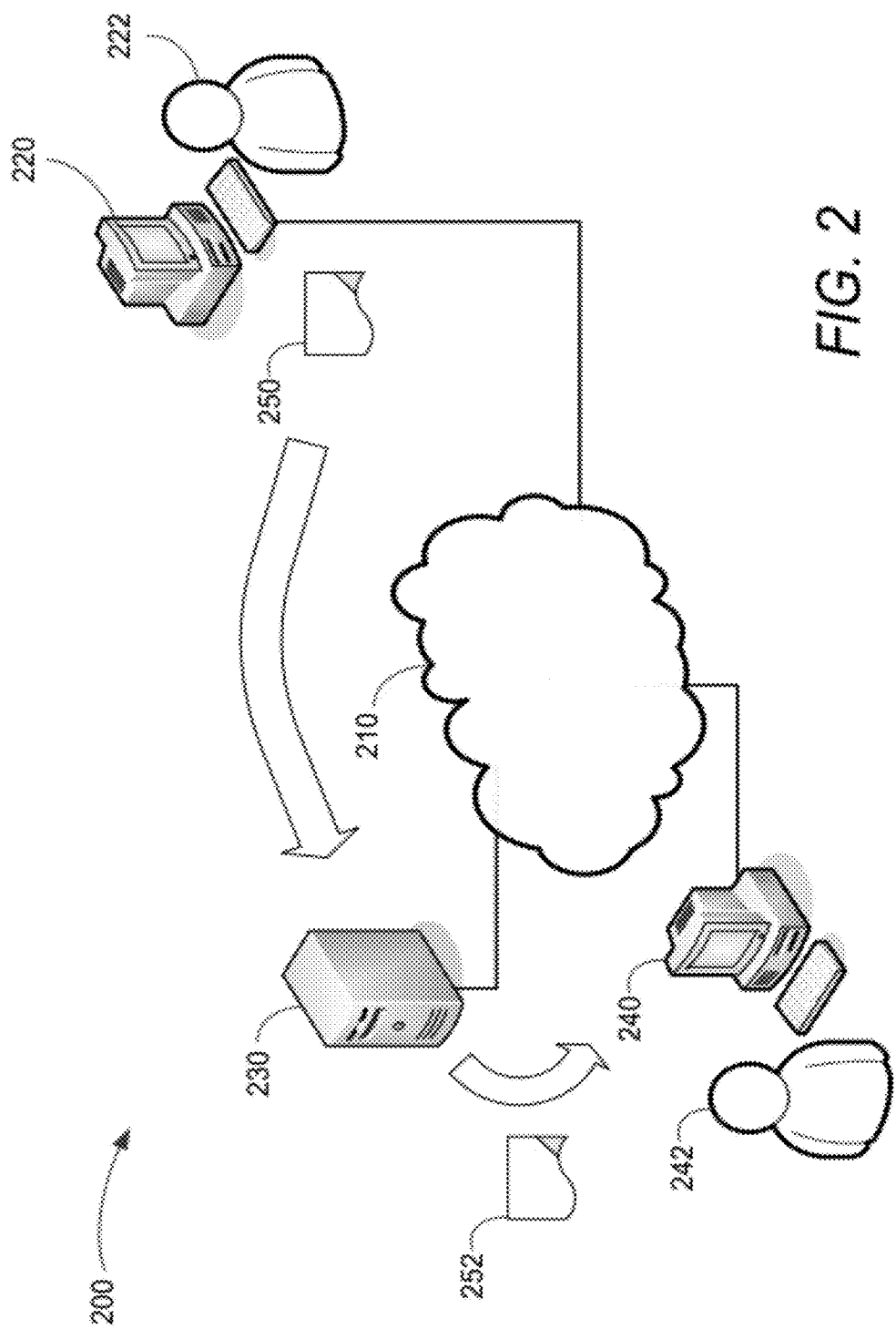
FIG. 2 is a block diagram of an exemplary network environment in which embodiments of the present invention may operate.

FIG. 2 illustrates an exemplary networking environment 200 where embodiments of the present invention may be implemented. A user 222 utilizes a computer system 220 to execute software. The computer system 220 may be, for example, the computer system 110 of FIG. 1. The software may encounter an error while executing on computer system 220. An exception handler of the computer system may gather diagnostic information about the error, including information about an exception that was thrown in response to the error and information related to the propagation of the exception through the various threads implementing the software.

Diagnostic information about errors may be useful for a developer 242 of the software. Therefore, the user's computer system 220 may ask the user 222 for permission to send information pertaining to the error to the developer 242. The user's computer system may package the information into at least one message 250 and send the at least one message to a server 230 associated with the software developer 242. When the developer 242 wishes to review and/or analyze the error information, the developer 242 uses a computer system 240 to access the server 230 and retrieve the stored error information. The error information may be stored, filtered and then sent to the developer's computer system 240 in any suitable way, which may include at least one message 252.

The user's computer 220, the server 230 and the developer's computer may communicate using any type of communication media. The communication may be a network such as a LAN, WAN or the internet 210. In some embodiments, the server 230 and the developer's computer system 240 may be implemented using a single computer system.

In some embodiments, the at least one message 250 containing the error information may be sent after each individual error occurs. In other embodiments, multiple errors can be saved on the user's computer 220, bundled together and sent to the server 230 at a later time. Accordingly, it should be appreciated that FIG. 2 schematically illustrates that error information is made available to a developer and the actual mechanism by which this information is made available is not critical to the invention.

Figure 3:
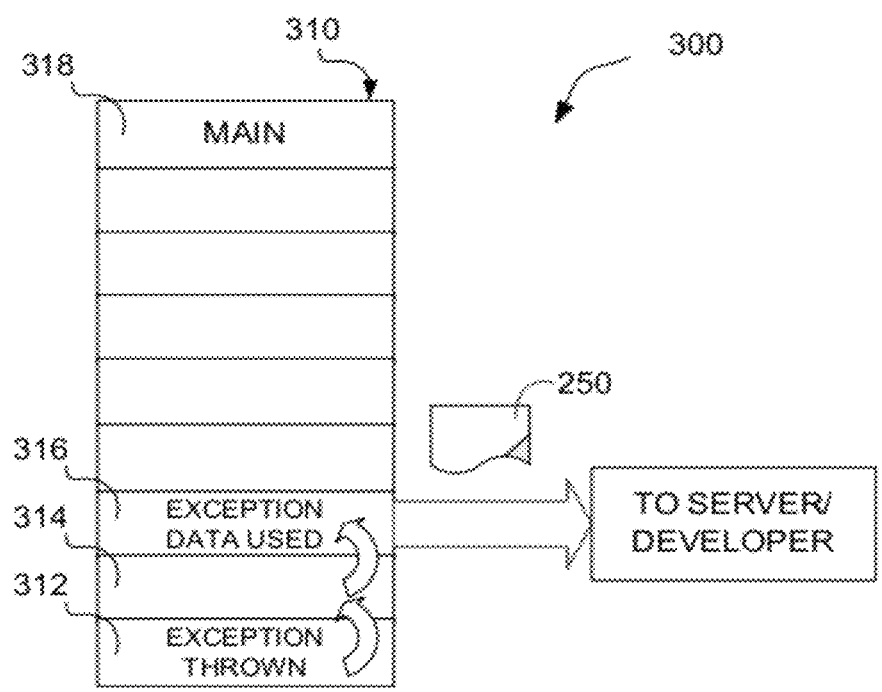
FIG. 3 is a block diagram illustrating exception handling as performed in the prior art.

An overview of exception handling as implemented in the prior art will be described in conjunction with FIG. 3. FIG. 3 illustrates a user task 300 operating on a computer system. The user task 300 is implemented using a single thread 310. The thread 310 comprises a call stack of functions, wherein the function 318 at the top of the call stack is generally the "main" function that is initiated when the user task 300 begins executing. The main function 318 may call some other function to execute some discrete operations. That function may then call yet another function. This chain of function calls may continue for as many function calls as is required by the software. The chain of function calls is the call stack associated with thread 310.

While executing a function 312 of thread 310, the software may encounter an error that causes the function 312 to "throw" an exception. Throwing an exception may comprise creating an exception object that includes information about the error as well as methods for accessing that information. In some situations, the exception may be handled directly by an exception handler for the function 312 that throws the exception. If the exception cannot be handled, the exception gets passed up the call stack to the function 314 that originally called function 312. In the example shown in FIG. 3, function 314 can not handle the exception either, so the exception is passed up to function 316, which originally called function 314.

In this example, function 316 is able to handle the exception. Handling the exception may mean that a resolution to the error was found and the software can continue to execute. In other situations, the error that caused the exception to be thrown may have been severe enough that handling the exception involves terminating execution of the software. In either case, diagnostic information about the error may be stored in the exception object. Also, propagation information about the functions to which the exception was passed (functions 312, 314 and 316 in this example), may be included in the exception object. This information may be included in a message 250 that is sent to the developer as described above with respect to FIG. 2.

The inventors have recognized and appreciated a shortcoming with such an approach for handling exceptions, particularly in a multi-threaded environment. Exception objects, in conventional exception processing systems have been thread specific. A single exception object was propagated up the call stack for a thread. However, when the exception propagated along any other path, propagation involved re-throwing the exception. Re-throwing an exception involved generating a new exception object to represent that re-thrown exception.

While exceptions propagated in this way could capture error information from different functions as an exception propagated up a call stack for the same thread, if the exception propagated in any way other than up a call stack, the error information was lost. Such a scenario could occur, for example, if the exception propagated from one thread to another thread or even within the same thread in any scenario in which a chain of execution of software components was represented other than as a call stack.

The inventors have recognized and appreciated that richer error information may be captured by separating the capture of error information from propagation of the exception. Accordingly, in some embodiments, error information is captured in an error information object that may be propagated separate from an exception object. As a result, even in scenarios when an exception is propagated by re-throwing it, which may result in a new exception object with previously captured information, the error information may persist. Such an error information object may be used, for example, in a multi-threaded environment.

Figure 4A:
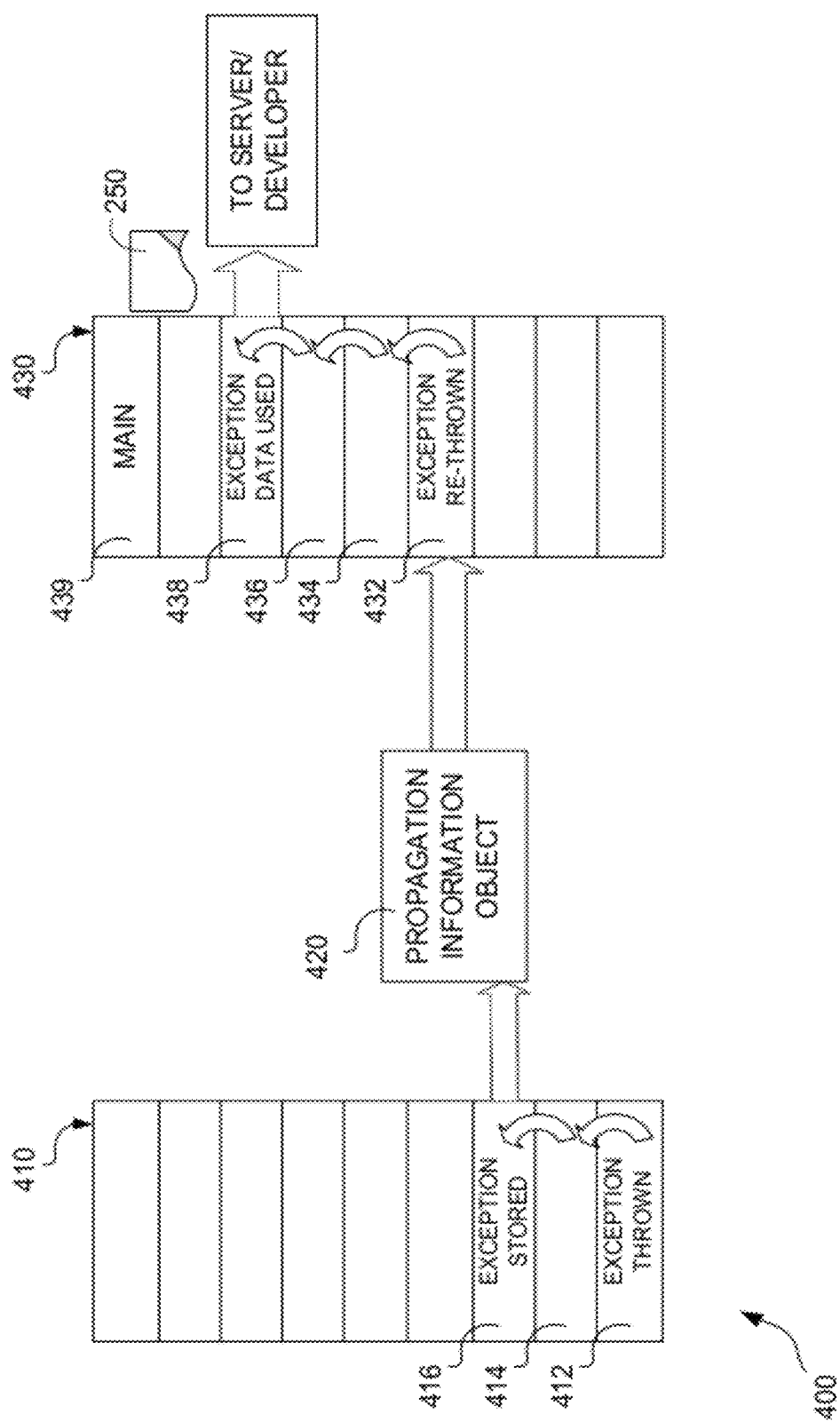
FIG. 4A is a diagram illustrating one embodiment of exception handling.

FIG. 4A illustrates an embodiment of multi-threaded exception handling. A user task 400 is executing concurrently using two different threads. In some embodiments a first thread 410 may be initiated by a second thread 430 or may otherwise execute functions called from the second thread. This allows the computer system executing the software to perform multiple functions of the user task 400 concurrently. In the example illustrated in FIG. 4A, the user task 400 began with the execution of the main function 439 of the second thread 430. A chain of function calls eventually lead to function 432 accessing a function in a first thread 410. The first thread 410 comprises its own call stack.

While executing function 412 of the first thread 410, the computer system executing the user task 400 may encounter an error. The error could be any unexpected occurrence during software execution and is not limited to any particular type of error. For example, an error could be a "divide by zero" error, wherein the software encounters a command to perform division with a divisor that is numerically equal to zero, resulting in an invalid division command. As a second example, an error could be a "no such file" error, wherein the software expects to open a file, but the file does not exist. An error would occur because the software would not be able to continue without the absent file. These examples of errors are for illustrative purposes only and are not meant to be limiting.

In response to the occurrence of the error, function 412 throws an exception. Throwing an exception may comprise creating an exception object to hold information related to the exception, which may be formed by an exception handling system as is known in the art or in any other suitable way. This information may be of any type. For example, the exception information may comprise diagnostic information that may be useful for a developer to analyze to fix the cause of the error in the software. The exception information may comprise an error code or a message that was presented to the user when the error occurred. The exception information may comprise data that was stored in memory when the error occurred. These examples of exception information are for illustrative purposes only and are not meant to be limiting.

The exception object may also comprise a plurality of methods for accessing the exception information stored within the object. These methods may, for example, comprise read and write commands as well as constructor and deconstructor methods for the object.

In addition to creating an exception object, a propagation information object 420 to store information related to the propagation history of the exception may be created. Propagation information object 420 also may be created by the exception handling system or by any other suitable component. In some embodiments, a propagation information object 420 may be created in response to throwing an exception. Though, in some embodiments, propagation information object 420 may be conditionally created as part of handling an exception. For example, such an object may be created only in response to an indication that an exception is to be propagated from one thread to another. In some embodiments, a software developer 242 may specify as part of creating software whether to propagate exception information persistently using a propagation information object 420. If not, conventional exception processing may be used. Alternatively or additionally, propagation information object 420 may be conditionally created based on runtime conditions. For example, when a new exception is encountered, propagation information object 420 may be created. In scenarios in which an exception is being re-thrown, no propagation information object 420 may be created. Rather, an existing object may be used.

In the embodiment illustrated, the propagation information object 420 is separate and distinct from the exception object 420. When the exception object is specific to a particular thread, the propagation information object 420 is accessible to all threads executing portions of the user task 400. In some embodiments, the propagation information object 420 is made accessible to all threads of the user task 400 by storing the object as a global variable. Making propagation information object 420 separate from an exception object allows a conventional exception handling system to continue to process exceptions using techniques as are known in the art. In embodiments in which an exception handling system has a capability to process re-thrown exceptions without creating a new exception object, propagation information object 420 may be combined with an exception object.

Regardless of the mechanism used to control generation of propagation information object 420, the object may store any suitable information. The propagation information stored in the propagation information object 420 may, for example, comprise the name of the functions that the exception is passed to from the time the exception is thrown to the time the exception is handled. Alternatively or additionally, the information may include state information or other information that may be useful for a software developer responding to the error. However, the propagation information is not so limited.

In the specific example shown in FIG. 4A, function 412 throws the exception and passes the exception object up the call stack to function 414, which subsequently passes the exception object to function 416. At this point, function 416 stores the propagation information in the propagation information object 420.

FIG. 4B illustrates some details of the propagation information object 420. The object may comprise both propagation information 422 and methods 424 used to access the information stored within the object. These methods 424 may include read and write methods as well as methods for passing the propagation information in an inter-thread message. These methods, for example, may allow an exception handler to specify that error information is added to an existing propagation information 422 or to otherwise add to, delete or change the data already stored. Though, it should be appreciated that an object is not limited to the form illustrated in FIG. 4B. Any suitable mechanism may be used to capture data and manipulate it.

The creation of the propagation information object 420 may occur at any point during the exception handling process of the first thread 410. For example, the propagation information object 420 may be created at the same time as the exception object. In this case, the propagation information may be added to the propagation information object 420 each time the exception is passed up the call stack to another function. In some embodiments, the propagation information object 420 may no be created until the software is ready to store the propagation information so that it may be used in the second thread 430. These examples of timing for the creation of the propagation information object 420 relative to other acts in the exception handling method are merely illustrative and not intended to be limiting.

Turning back to FIG. 4A, the propagation information object 420 is accessible to the second thread 430. In some embodiments, the propagation information object 420 may be sent as or identified in an inter-thread message from the first thread 410 to the second thread 430. Though, it should be appreciated that techniques are known in the art for making an object, created in one thread, accessible to another thread and any suitable technique, including techniques as are known in the art, may be used.

The developer may determine whether function 432 within the second thread 430 will add information to propagation information object 420 so that the error information may continue to propagate through the functions of the second thread 430. The exception is "re-thrown" by function 432 which may result in creating a new exception object. The new exception object may not contain propagation information from thread 410. Nonetheless, if the developer has elected to retain this information, it may be retained in propagation information object 420. The new exception object may propagate up the call stack associated with the second thread 430, passing from function 432 to functions 434 and 436 and finally to function 438 where the exception data is used and the exception is handled.

At function 438, where the exception is resolved, some or all of the propagation history through both the call stack of the first thread 410 and the call stack of the second thread 430, may be sent to the developer 242 of the software as described in conjunction with FIG. 2. For example, information may be sent as a message 250 to a server 230 associated with the software developer 242.

FIG. 4C illustrates example pseudocode of function 432 that re-throws the exception in the second thread 430 of FIG. 4A. It should be understood by one skilled in the art that FIG. 4C represents a simplified example and the pseudocode illustrated is in no way limiting. Also, function 432, and the rest of the software, may be written in any computer programming language. For example, the software may be written in C++, Visual Basic, Java, C#, JavaScript or any other programming language. The software may also utilize a software framework such as Microsoft's .NET Framework. The software framework may, for example, provide the exception handling functions that are used by the developer 242 while writing the software code. However, the exception handler is not so limited and may be implements by any means. For example, a developer 242 may choose to develop and write custom exception handling functions to implement embodiments of the present invention.

Function 432 comprises computer executable code for performing a portion of the user task 400. As discussed above, the function 432 may be on a call stack as a result of some other function, such as the main function 439, causing the function 432 to execute. Similarly, function 432 itself may call one or more other functions, as illustrated in FIG. 4C by the pseudocode calling function 416. In some embodiments, the code of function 432 may indicate that the functions calls should be executed in a new thread. This is illustrated in function 432 by the command "runInNewThread." As illustrated in FIG. 4A, this command results in a the first thread 410 executing the function, rather than the second thread 430 where function 432 is being executed. In embodiments where Microsoft's .NET Framework is used, invoking a different thread to perform a function can be accomplished using the Task Parallel Library.

Computer executable code describing the exception handling capabilities of function 432 are not limited to any order and may occur anywhere in the function. For example, blocks of exception handling code may be interspersed with the code that is actually used to perform user task 400. In other embodiments, such as the embodiment shown in FIG. 4B, the exception handling code may occur at the end of the function after the bulk of the code associated with performing user task 400.

The exception handling portion of function 432 is not limited to be written in any specific manner. The pseudocode in FIG. 4C is for illustrative purposes only and not meant to be limiting. If an exception is encountered, while function 432 is executing, the exception may be caught by the exception handler of function 432. Such an exception may be a new exception generated by execution of function 432. Though, the exception may be propagated from another thread or other source outside the call stack containing function 432. In that case function 432 may process the exception differently depending on the origin of the exception. If the exception is determined to be received from a different thread, such as first thread 410, then the propagation information in the propagation information object 420 is kept intact and the exception is re-thrown. New propagation information may then be added to the propagation information object 420 related to the propagation of the exception through the call stack of the second thread 430.

If the exception is determined to be a new exception, thrown by function 432 within the second thread 430, then a new propagation information object is created. If the exception has propagated through the call stack of the thread executing function 432, information related to the exception also may be added to the object. In this example, different actions associated with different scenarios may be expressly coded in the exception handler of function 432, as illustrated. This coding may be implemented by calls to the methods 424, or in any other suitable way. Further, it is not a requirement that the specific action be programmable in this way. In some embodiments, an exception handling system may automatically select whether a new propagation information object 420 is created or error and propagation information is added to an existing object.

By providing a mechanism to collect information, separate from the propagation of exceptions, and to control how that information is processed, further rich information may be collected in scenarios in which an error in one thread creates consequences in multiple other threads. In conventional systems, such a scenario required complex analysis of error traces to identify. Use of a propagation information object readily allows such scenarios to be identified because each thread experiencing consequences of an error may either add its information to the same propagation information object 420, allowing all the error information to be easily associated, or create an additional propagation information object, allowing its error information to be separated from that in other threads.

Figure 5:
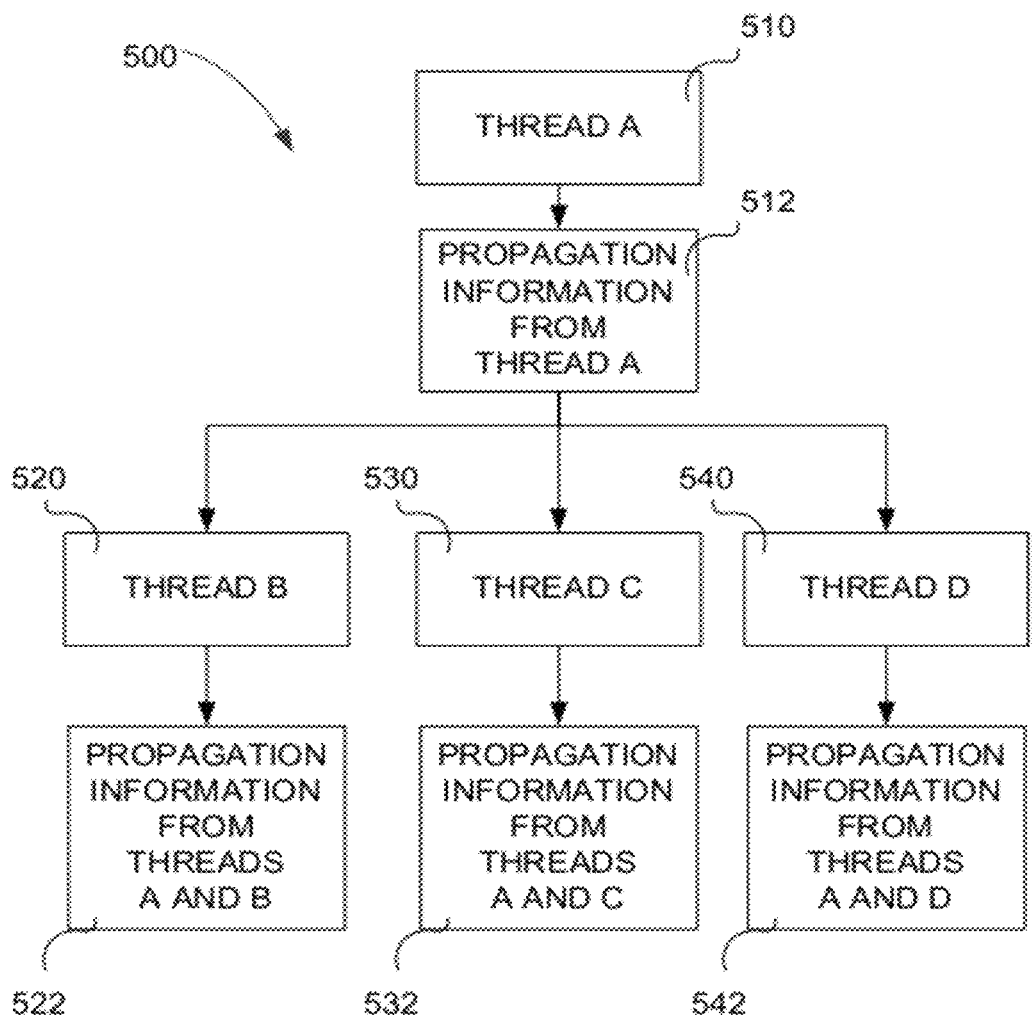
FIG. 5 is a flow diagram illustrating multiple parallel propagation information objects in a multi-threaded environment.

FIG. 5 illustrates an embodiment wherein the result of an error from a single thread may be used by a plurality of other threads. The specific example shown in FIG. 5 is for illustrative purposes only and is not meant to be limited. A user task 500 may have, for example, four different threads associated with it: thread B 520, thread C 530 and thread D 540 all of which use the results from the execution of functions in thread A 510. If an error is encountered while executing thread A 510, then a propagation information object 512 containing the propagation history through the call stack of thread A 510 may be accessible to thread B 520, thread C 530 and thread D 540. As discussed above, the propagation information object 512 may be accessible to the other threads by storing the object 512 as a globally accessible variable. It may also be sent to the other threads as part of an inter-thread message or any other suitable way.

Each of thread B 520, thread C 530 and thread D 540 may re-throw the exception. However, the propagation information related to the path of the exception through the call stack of thread B 520 has no relevance to the execution of thread C 530 or thread D 540. Therefore, multiple propagation information objects 522, 532 and 542 are created. Thread B creates propagation information object 522 which only contains propagation information pertaining to thread A 510 and thread B 520, but does not contain information pertaining to thread C 530 or thread D 540. Similarly, thread C creates propagation information object 532 which only contains propagation information pertaining to thread A 510 and thread C 530, but does not contain information pertaining to thread B 520 or thread D 540. Similarly, thread D creates propagation information object 542 which only contains propagation information pertaining to thread A 510 and thread D 540, but does not contain information pertaining to thread B 530 or thread C 530.

Figure 6:
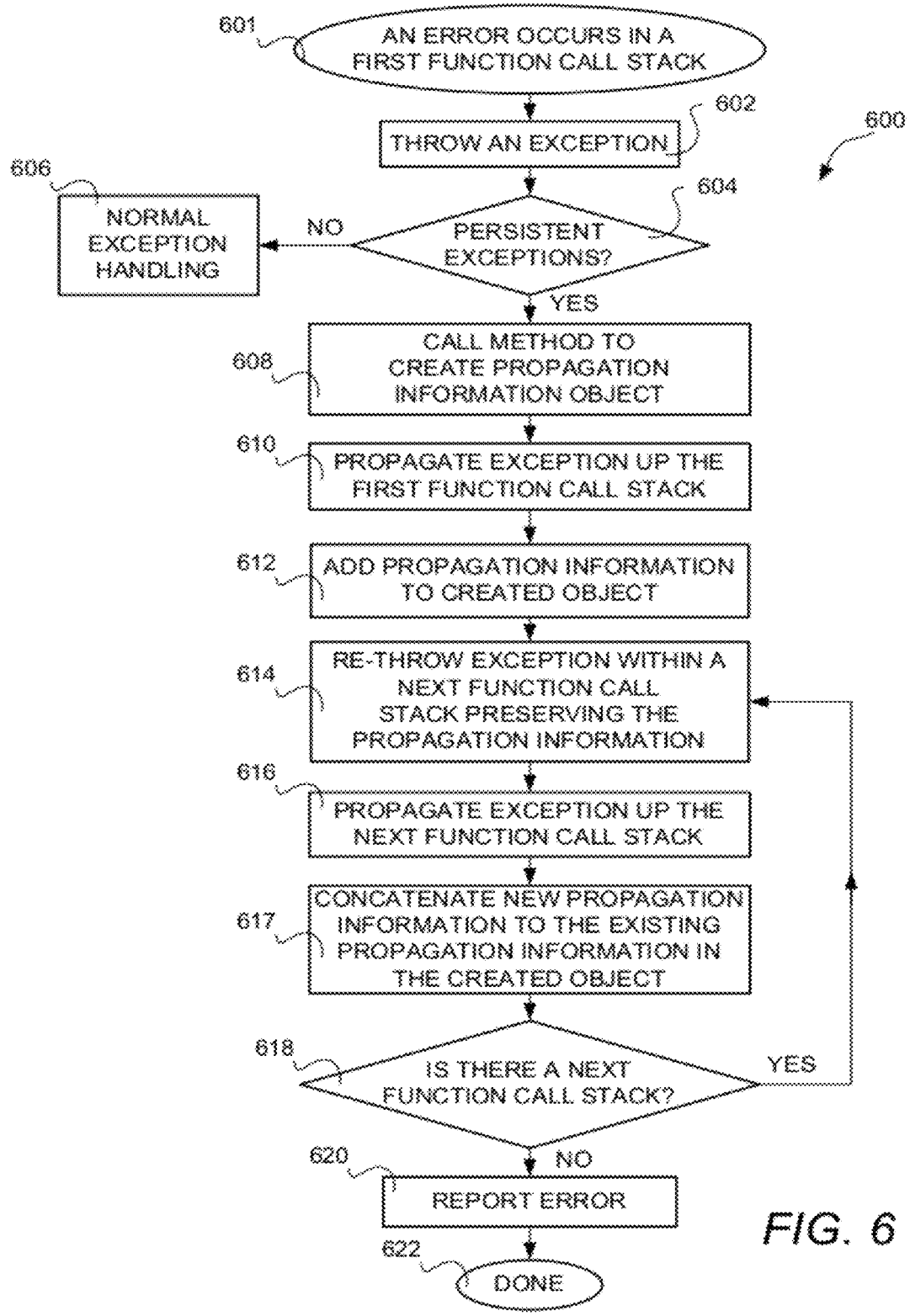
FIG. 6 is a flow chart illustrating a method of exception handling using propagation information objects.

FIG. 6 illustrates a flow diagram of a method for implementing exception handling in a computer system. The method starts at act 601 by encountering an error while executing a first function of a first call stack. In response to the error, an exception is thrown at act 602. Throwing an exception may comprise creating an exception object. At act 604, the software checks whether the developer programmed the software to use persistent exceptions. If not, then the method proceeds to act 606 and handles exceptions as they would be handled by the prior art—with the exception information being constrained to a single thread. If the developer has opted to use persistent exceptions, then at act 608 the computer system calls a method to create a propagation information object to store information pertaining to the propagation history of the exception through the first call stack.

At act 610, the exception may propagate up through the first call stack. Information pertaining to this propagation is added to the propagation information object at act 612. This information may be added to the object at any time. For example, information may be added to the propagation information object every time that the exception is passed from one function to another function. Or, the information may be added to the propagation information object once the exception is finished propagating through the first call stack.

At act 614, the exception may be re-thrown within a second function of a second call stack. The exception may then propagate within the second call stack at act 616. At act 617, the new propagation information related to the propagation through the second call stack is concatenated to the existing propagation pertaining to the propagation of the exception through the first call stack.

At act 618, the software checks whether there is another call stack to which the exception should be passed. If there is, then the method loops back to act 614 where the exception is re-thrown by the next call stack in the chain. This loop may iterate as many times as necessary to propagate the exception to a function in the plurality of threads that can handle the exception. Once the software determines that the exception can be handled the method may continue to act 620 where information pertaining to the error may be reported to the developer of the software. The error information may, for example, include the various propagation history from the plurality of call stacks that the exception propagated through. The method terminates at act 622.

Referring back, momentarily, to FIG. 4A, in some embodiments, the propagation information object 420 may be created at the same time as the exception object. In such embodiments, the propagation information may be stored directly in the propagation information object 420. In other embodiments, propagation information may be stored in the exception object and the propagation information object 420 may not be created until function 416 at the point where the propagation information of the exception needs to be stored. When the propagation information object 420 is created, the propagation information from the exception object may be copied to the propagation information object 420. In some embodiments, the propagation information object 420 may store all the information that was originally stored in the exception object. After the information is copied to the propagation information object 420, the exception object may be deleted.

In some embodiments, when the exception is re-thrown at function 432 of the second thread 430, the exception object may be filled with some or all of the information from the propagation information object 420. The propagation information object 420 may then be destroyed in some embodiments. In other embodiments, the propagation information object 420 is kept in memory until the exception is handled and new propagation information is added to the propagation information object 420 as the exception propagates through the various threads of user task 400.

Figure 7:
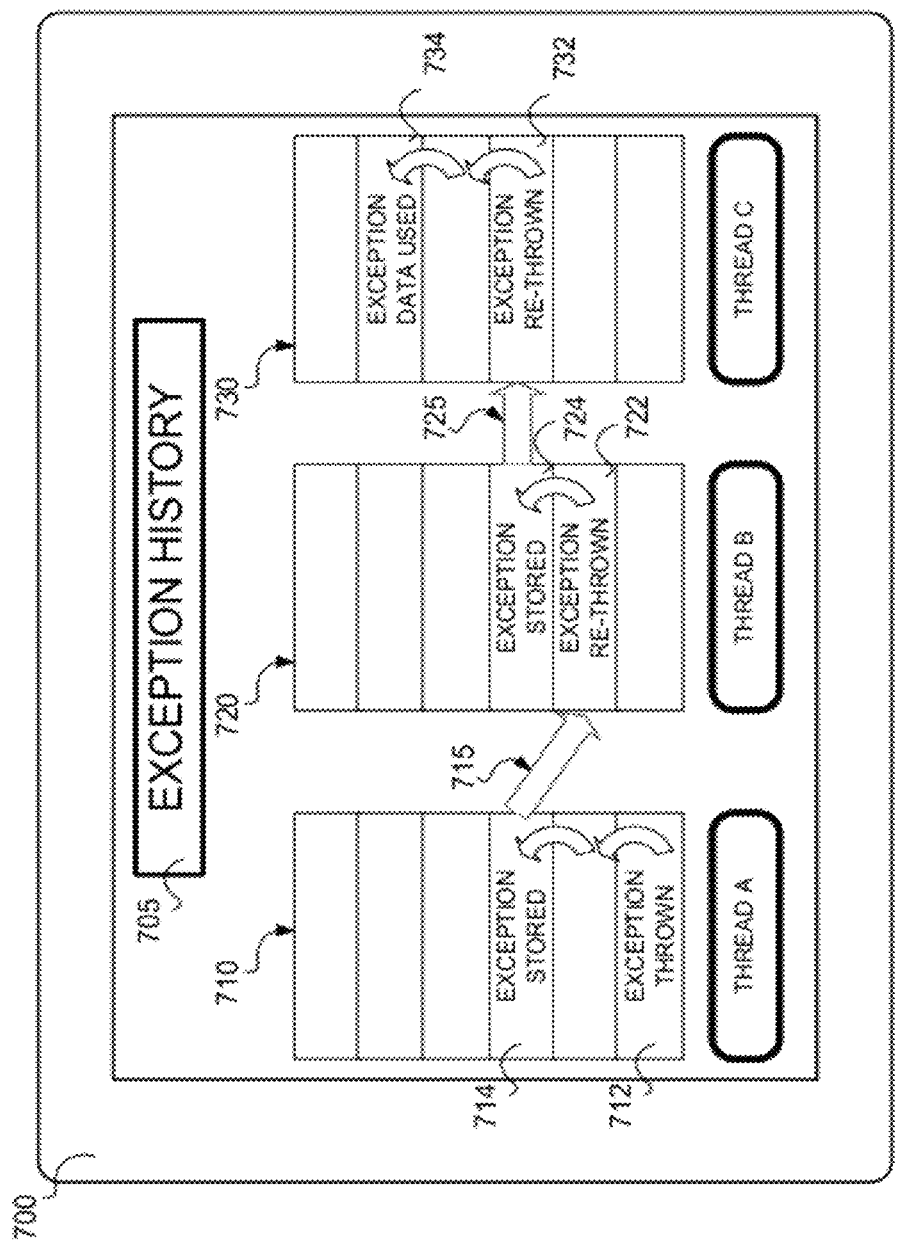
FIG. 7 is a block diagram illustrating a display device for displaying an exception's propagation history.

Error information captured as above may be used in any suitable way. In some embodiments, it may be presented to allow analysis of errors. FIG. 7 illustrates a display device 700 that may be associated with the computer system 240 of the software developer 242. When the developer 242 receives error information from the computer system 220 of the software user 222, the developer 242 may choose to review the various received diagnostic information describing the exception history 705.

In the example, shown in FIG. 7 the exception was thrown and re-thrown in three different threads. The details of this configuration are for illustrative purposes only and not meant to be limiting. The display device 700 shows a first graphical representation of a first call stack 710 associated with thread A. This call stack comprises at least two functions: the function 712 where an error was an encountered and the exception was thrown and the function 714 where the exception information was stored in a propagation information object. The first graphical representation may comprises diagnostic information related to the error, exception information to the exception and propagation information related to the propagation of the exception through the first call stack 710. In some embodiments, the propagation information comprises the names of the functions through which the exception passed. In some embodiments the diagnostic information may comprise data that was stored in memory when the error occurred. The diagnostic information may also comprise the state of certain variables being used by the software at the time of the error. In some embodiments, the exception information may include the type of exception, a message presented to the user, or any other information.

In some embodiments the display device 700 may display a plurality of graphical representations of call stacks depending on the number of threads involved with the exception handling. In the specific example shown in FIG. 7, there are two additional call stacks 720 and 730 represented. A graphical representation of call stack 720, which is associated with thread B, shows a function 722 re-throwing the exception and passing the exception to function 724 where it was stored in a similar manner as described above in conjunction with call stack 710. A graphical representation of call stack 730, which is associated with thread C, shows a function 732 re-throwing the exception at function 732 and the exception propagating to function 734 where the exception data is used to handle the exception. Note that there may be any number of functions between where the exception is thrown and where the exception information is stored. For example, in call stack 710, there is one function between the function that throws the exception and the function that stores the exception information. In call stack 720, there is no function separating where the exception is re-thrown and where the exception information is stored. In other embodiments, there may be a plurality of functions separating the where the exception is re-thrown and where the exception information is stored.

The display device 700 may also display a graphical representation of the discontinuities between the separate call stacks. For example, arrow 715 indicates the passage of exception propagation information between call stack 710 and call stack 720, each executed on different threads. The placement of the arrow indicates which function 714 in the first call stack 710 stored the exception information and which function 722 in the second call stack 720 re-threw the exception. Similarly, arrow 725 indicates the passage of the exception propagation information between call stack 720 and call stack 730.

Having thus described several aspects of at least one embodiment of this invention, it is to be appreciated that various alterations, modifications, and improvements will readily occur to those skilled in the art.

For example, embodiments were described above in which a propagation information object was created by an exception handler of a function in a first thread prior to propagating an exception to a function in a different thread. Alternatively or additionally, the propagation information object may be created in association with handling that error when it is caught by the function in the second thread.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method for operating a computer system comprising at least one processor executing computer software, the method comprising:
   throwing an exception based on encountering an error while operating a first thread, the thread comprising a plurality of function calls and the exception being thrown while executing a first function of the first thread;
   creating a propagation information object;
   propagating the exception from the first function of the first thread to a second function of the first thread;
   adding information related to the propagation of the exception to the propagation information object;
   re-throwing the exception while executing a third function of a second thread;
   propagating the exception from the third function of the second thread to a fourth function of the second thread; and
   concatenating new information related to the propagation of the exception through the second thread to the propagation information object.

2. The method of claim 1, wherein creating the propagation information object is done in response to an indication that the information related to the propagation of the exception will be used by the second thread.

3. The method of claim 1, wherein throwing the exception comprises creating an exception object, separate from the propagation information object.

4. The method of claim 1, further comprising:
   storing the propagation information object such that it is accessible by at least the first thread and the second thread.

5. The method of claim 1, further comprising:
   passing the propagation information object from the first thread to the second thread.

6. The method of claim 1, wherein the first function and the second function are associated with a first call stack and the third function and the fourth function are associated with a second call stack.

7. The method of claim 1, wherein the first thread and the second thread are executed concurrently on two separate processors.

8. The method of claim 1, wherein the first and second threads execute asynchronously on a single processor.

9. The method of claim 1 further comprising:
reporting the error to a developer of the computer software.

10. The method of claim 1, wherein the propagation information object is a first propagation object, further comprising:
re-throwing the exception while executing a fifth function of a third thread;
creating a second propagation information object comprising the information related to the propagation of the exception through the first thread, but not information related to the propagation of the exception through the second thread;
propagating the exception form the fifth function to a sixth function of the third thread;
concatenating new information related to the propagation of the exception to the propagation information object through the third thread to the second propagation information object.

11. A display device for displaying information related to the propagation history of an exception, the exception having been thrown during the execution of software, the display device displaying:
a first graphical representation of a first function and a second function of a first call stack, the first graphical representation comprising:
diagnostic information related to an error that occurred in the first function;
first exception information related to an exception that was thrown by the first function in response to the error; and
first propagation information related to a propagation of the exception from the first function to the second function of the first call stack;
a second graphical representation of a third function and a fourth function of a second call stack, the second graphical representation comprising:
second exception information related to the exception that was re-thrown by the third function; and
second propagation information related to the propagation of the exception from the third function to the fourth function of the second call stack; and
a third graphical representation of a discontinuity between the first call stack and the second call stack, the third graphical representation comprising:
third propagation information related to the propagation of the exception from the first call stack to the second call stack.

12. A display device of claim 11, wherein:
the diagnostic information comprises a type of the error that occurred.

13. A display device of claim 11, wherein:
the first propagation information comprises one or more names of functions in the first call stack that the exception was passed to prior to being passed to the second function; and
the second propagation information comprises one or more names of functions in the second call stack that the exception was passed to prior to being passed to the fourth function.

14. A display device of claim 11, wherein the second propagation information further comprises:
information indicating that the fourth function of the second call stack stored the information related to the propagation of the exception.

15. At least one computer-readable storage medium comprising computer-executable instructions, that when executed by a processor of a computer system, perform a method comprising:
receiving exception propagation information from a propagation information object, the exception propagation information comprising information pertaining to an exception originally thrown by a first function of a first thread;
re-throwing the exception while executing a second function of a second thread;
propagating the exception from the second function of the second thread to a third function of the second thread; and
concatenating new information related to the propagation of the exception through a second call stack of the second thread to the propagation information object that was created by the first function of the first thread.

16. The at least one computer-readable storage medium of claim 15, wherein the method further comprises:
reporting the error to a developer of the computer software.

17. The at least one computer-readable storage medium of claim 16, wherein the act of reporting the error comprises sending at least a portion of the information stored in the propagation information object to a server associated with the developer of the computer-executable instructions.

18. The at least one computer-readable storage medium of claim 15, wherein the first thread and the second thread are executed on two separate processors.

19. The at least one computer-readable storage medium of claim 15, wherein the method further comprises reporting, to an external error reporting service, the exception propagation information and the new information as a report of the exception originally thrown by the first function of the first thread.

20. The at least one computer-readable storage medium of claim 15, wherein the first and second threads execute concurrently or asynchronously on the at least one processor.

* * * * *